(12) United States Patent
Gervais et al.

(10) Patent No.: US 11,195,317 B2
(45) Date of Patent: Dec. 7, 2021

(54) METHOD FOR PRODUCING ANIMATED IMAGES

(71) Applicant: Jean-Claude Colin, Versailles (FR)

(72) Inventors: Than Marc-Eric Gervais, Paris (FR); Bruno Loubet, Paris (FR); Nicolas Bessou, Sar Trouville (FR); Yves Guimiot, Conflans Saint Honorine (FR); Mikael Petitfils, Livry-Gargan (FR); Sebastien Roques, Paris (FR)

(73) Assignee: Jean Claude Colin, Versailles (FR)

( * ) Notice: Subject to any disclaimer, the term of this patent is extended or adjusted under 35 U.S.C. 154(b) by 441 days.

(21) Appl. No.: 15/524,199

(22) PCT Filed: Nov. 5, 2014

(86) PCT No.: PCT/FR2014/000237
§ 371 (c)(1),
(2) Date: May 3, 2017

(87) PCT Pub. No.: WO2016/071577
PCT Pub. Date: May 12, 2016

(65) Prior Publication Data
US 2017/0337724 A1    Nov. 23, 2017

(51) Int. Cl.
| | | |
|---|---|---|
| *G06T 13/80* | (2011.01) | |
| *H04N 19/12* | (2014.01) | |
| *H04N 19/14* | (2014.01) | |
| *H04N 19/645* | (2014.01) | |
| *H04N 19/172* | (2014.01) | |

(Continued)

(52) U.S. Cl.
CPC ............ *G06T 13/80* (2013.01); *G06T 9/00* (2013.01); *H04N 19/12* (2014.11); *H04N 19/14* (2014.11); *H04N 19/172* (2014.11); *H04N 19/33* (2014.11); *H04N 19/645* (2014.11); *G06T 2210/36* (2013.01)

(58) Field of Classification Search
CPC ........ H04N 19/59; H04N 19/63; H04N 19/13; H04N 21/2662; H04N 19/12; H04N 19/14; H04N 19/645; H04N 19/172; H04N 19/33; G06T 3/40; G06T 3/4084; G06T 13/80; G06T 9/00; G06T 2210/36
See application file for complete search history.

(56) References Cited

U.S. PATENT DOCUMENTS 8,442,311 B1 *    5/2013  Hobbs ................. G06T 9/00
                                               382/166
2004/0010614 A1 * 1/2004  Mukherjee ....... H04N 21/23439
                                               709/231

(Continued)

OTHER PUBLICATIONS

Rabbani, M., et al., "An Overview of the JPEG 2000 Still Image Compression Standard," Signal Processing, Image Communication, vol. 17, No. 1, Jan. 2002, pp. 3-48.

(Continued)

*Primary Examiner* — Maurice L. McDowell, Jr.

(57) ABSTRACT

Disclosed is a process for producing an animation of the multipage type, in which each still image of the animation has scalability properties. Preferably, each still image is to be saved on at least two levels, the first level containing few details and each following level providing additional details to the preceding level.

19 Claims, 1 Drawing Sheet

(51) Int. Cl.
*H04N 19/33* (2014.01)
*G06T 9/00* (2006.01)

(56) References Cited

U.S. PATENT DOCUMENTS

| | | | | |
|---|---|---|---|---|
| 2004/0085460 | A1* | 5/2004 | Shiomi | H04N 5/232 348/231.3 |
| 2004/0202372 | A1* | 10/2004 | Sakuyama | H04N 19/645 382/233 |
| 2006/0072838 | A1* | 4/2006 | Chui | G06F 3/0481 382/232 |
| 2007/0014480 | A1* | 1/2007 | Sirohey | A61B 6/482 382/240 |
| 2007/0016594 | A1* | 1/2007 | Visharam | G11B 27/3027 |
| 2008/0144711 | A1* | 6/2008 | Chui | H04N 19/159 375/240.01 |
| 2010/0146447 | A1* | 6/2010 | Ubillos | G06F 3/0483 715/828 |
| 2015/0161823 | A1* | 6/2015 | Anderson-Sprecher | G06T 15/005 345/419 |

OTHER PUBLICATIONS

Amonou, I., et al., "Optimized Rate-Distortion Extraction with Quality Layers in the Scalable Extension of H.264/AVC," IEEE Transactions on Circuits and Systems for Video Technology, vol. 17, No. 9, Sep. 2007, pp. 1186-1193.

Hui, L., et al., "An Adaptive Hybrid DPCM/DCT Method for Video Coding," Signal Processing, Image Communication, vol. 5, No. 1-2, Feb. 1993, pp. 199-208.

International Search Report issued in Application No. PCT/FR2014/000237, dated Feb. 1, 2016.

* cited by examiner

METHOD FOR PRODUCING ANIMATED IMAGES

This invention mainly concerns the field of animations with multipage animated images.

Animation formats with the multipage type of animated images exist, particularly those known under the acronym GIF, for "Graphics Interchange Format". "GIF" type animations propose an interesting comprise between the image and the video: they enable several successive still images to be stored separately, the reason they are called multipage, and to display them at regular intervals. This makes it possible to have animations requiring computer processing far lighter than that of a video. These animations are generally played cyclically, in such a way that each image comes back at a normally regular interval.

In a video, the images can be compressed in accordance with another image, for instance thanks to the movement's predictive functions, such as in formats of the MPEG family. On the other hand, for animations of the multipage type, each still image is independent of the other still images; however, these formats have the disadvantage that, when the images become large, the corresponding medium is heavy and difficult to transport and share. Accordingly, an animation made up of such images, when it is published on a website or when it is sent to a mobile device, can take a long time to load or to display.

The purpose of the invention is to propose a process which enables an animation to be obtained that incorporates the advantages of GIF-type animations while being more fluid and rapidly downloadable/uploadable.

According to the invention, such a process comprises the use of scalable still images, that is images with scalability properties, preferably for all the images; each of the still images ought to be saved at least two levels, the first level containing few details and each following level providing additional details to the preceding level. As an advantage, to play an image, a level is first of all read before the higher ranking level, preferably by starting with the first level of the image. For each image, the data contained in all the levels available for said image are decompressed and displayed, or, the data corresponding only to the levels available for all the images are decompressed and displayed, or, only the data corresponding to the small group of levels are decompressed and displayed making it possible to achieve at least a specific image display resolution.

For each of the images, it would be preferable that each of these levels is located before the next level, in said medium's reading order. The animation's medium can understand, in said medium's reading order, all the levels of a first rank according to the order in which the animation images are intended to be played, then all the levels of the rank immediately above it, preferably starting with the first levels.

An image can be played according to the data stemming from a level of said image before the data of the higher rank have been read, then processed.

The image processed is favourably resized before being played, to achieve the display resolution sought.

The still images are previously favourably compressed by a wavelet method. It is preferable that the image medium should be a file.

As an embodiment of the invention, the still images were previously compressed by a method including at least one transformed by wavelets.

As an embodiment of the invention, the still images were previously compressed by a method including at least one difference between two adjacent pixels.

As an embodiment of the invention, at least one initial still image was compressed using an initial compression method, and at least a second still image was compressed using a second compression method.

Advantageously, the process according to the invention comprises a stage where each still image is analysed to determine the most suitable compression method.

Advantageously, the first compression method comprises at least one transformed by wavelets, and the second compression method comprises at least one difference between adjacent pixels.

As an embodiment of the invention, the analysis stage files all the images by contrast level, the images with the lowest contrast are compressed by the first method, and those with the greatest contrast are compressed by the second method.

The invention is also based on a medium for implementing a process according to the invention, characterised by the fact that it comprises, in said medium's reading order, all first rank levels according to the order in which the animation's images are intended to be played, then all the levels at the rank immediately above, preferably starting with the first levels.

The invention is again based on a process for selecting a still image from such an animation medium, where a level of a rank for displaying a preview of the medium's images is used without reading or without reading and processing the images from to higher ranks.

The invention is again based on a process, characterised by the fact that a fixed image medium is created from levels of the selected still image.

The invention is also based on a computer program to produce a multipage type of animation, characterised in that the animation medium comprises still images with scalability properties, preferably for all the images.

For compression formats which use a preview of the image with only some of the data and to obtain, by level, the scalability enabled previews of the image to be obtained that are more and more accurate as the data are decompressed. Such scalability is used statically, that is for a single image, such as in Jpeg2000 and PGF formats. The GIF format enables several images to be stored within one and the same medium, but not the scalability.

"Level" is what is called a set of consistent information created during compression, combined with the preceding levels, enabling the image to be decompressed with a determined resolution. Advantageously, this level contains all the image layers for this level. As an example, if the image is of a YcbCr type, the level favourably contains data for the Y layer, the Cb layer and the Cr layer for this level. Hence, the information contained in a level, combined with the information from preceding levels, enables the image to be decompressed and displayed with the resolution sought.

Several ways of running the invention will be described hereafter, as non-restrictive examples, in reference to the appended drawings in which:

FIG. 1 uses a diagram to show the levels of a compressed still image, represented in two dimensions. The size of each of the rectangles represents the resolution of the image, once all the levels up to the one represented by the rectangle are decompressed;

Figure 1:
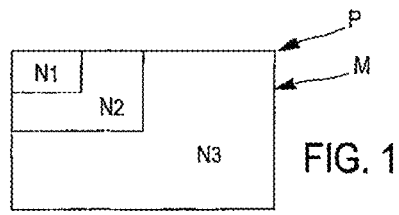

FIG. 1 shows the resolution obtained on decompressing each of the three previously compressed N1-N3 successive levels. In this way, decompressing a single N1 level, comprising less details, will generate an image with a resolution such as that of the zone occupying the upper left-hand corner of the M-matrix. Obviously, this partially decompressed image may be resized to achieve the display resolution of the image, or the size of a screen. Decompressing data second level N2, combined with the first level N1, will generate a more detailed image, the resolution of which will be equal to the whole zone occupying the upper left-hand of the M-matrix; plus the intermediary zone of the M-matrix, located at the bottom and to the right of this. Lastly, decompressing all the levels N1, N2 and N3, combined together will generate a complete image whose resolution is in proportion to the surface of the M-matrix.

In the illustrated example:
- the first level N1 covers $\frac{1}{16}^{th}$ of the size of the M-matrix, in other words, that if only the first level N1 is decompressed, an image representing $\frac{1}{16}^{th}$ of the size of the original image will be obtained;
- the data of the first and second levels N1 and N2, cover $\frac{1}{4}^{th}$ of the size of the M-matrix, in other words, that if only the two first levels N1 and N2 are decompressed, an image representing $\frac{1}{4}^{th}$ of the size of the original image will be obtained;
- the data of the first, second and third levels N1-N3 cover the whole size of the M-matrix, in other words, that if the three levels N1-N3 are decompressed, the whole original image will be obtained;

Each level has data representing the image, with a lower resolution than the following level. Each level uses data from the previous level at the same time as its own data. Such an image is therefore scalable, it has the scalability property, in other words that a level can be decompressed after the preceding one, without having to decompress any of the following levels.

It is faster to decompress the first level to obtain an initial preview of the image rather than waiting to decompress three levels; once the second level has been decompressed, an improved preview of the image may be obtained while the third level is being decompressed; this is how the scalability property of such an image is expressed.

Later on, we will describe how, according to the invention, the scalability property of the images is used.

Figure 2:
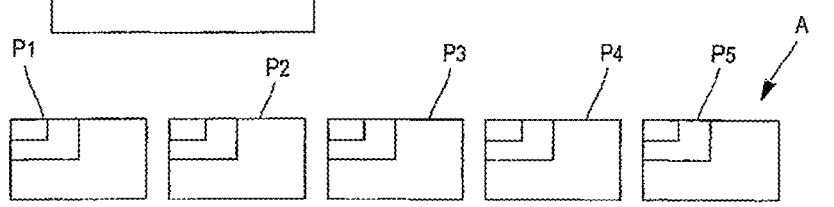
FIG. 2 shows a multipage animation, comprising five compressed images with three equivalent resolution levels for each image, according to the method in FIG. 1.

FIG. 2 shows a multipage A-animation comprising a sequence of five P1-P5 images compressed according to the method in FIG. 1, on three N1-N3 levels. In the description, for each Pn image in the A-animation, the Nm level is noted Pn:Nm with, in this case, an alternative of 1 to 5 and m alternative of 1 to 3. The Pn images are a set of coded images with scalability, or a set of images that are coded or recoded with scalability for the requirements of the application. For example they may stem from a set of JPEG images in an image gallery or images from a camera.

Then, all the data enabling an image to be decompressed and displayed will be called a "medium". These data may be contained in a file or a "image file". They may also be contained in the memory of a mobile device, such as a telephone or a digital camera, or sent by means of a network protocol.

Figure 3:
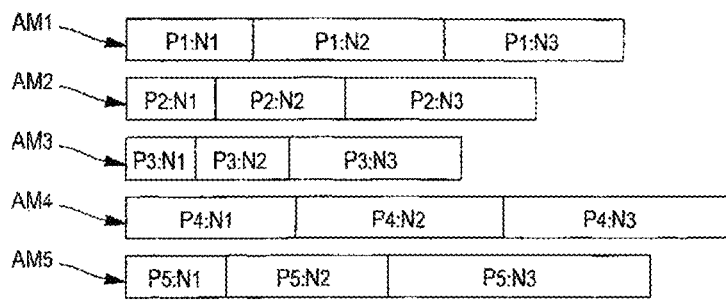
FIG. 3 shows the organisation of the FIG. 2 animation data, according to the first method for implementing the invention, where the images are stored, one after the other, and by successive levels within each image.

FIG. 3 shows the layout of an AM medium for the A-animation, according to an initial method for implementing the invention. The AM medium is comprised of five pages AM1-AMS, each corresponding, in the order in which they are displayed, to a respective image P1-P5. Un each AMn page, the data are filed in the order of levels N1-N3, so that the data in the first level Pn:N1 of a Pn image are arranged before those of the second level Pn:N2, themselves before those of the third level Pn:N3. In this way, for each image, each level may be read and decompressed before the following one.

For each page, AMn corresponds to a given display time, corresponding to the pace of the animation. This representation by level makes it possible, for each image, to decompress and display the required resolution only. For instance, if the decompression of levels N1 and N2 of each image is sufficient to display each image at the resolution of the device's screen on which the animation is read, it is possible, with this representation of the data, to decompress and display only levels N1 and N2 of each image, thus economising resources compared with full decompressing all the levels.

Figure 4:
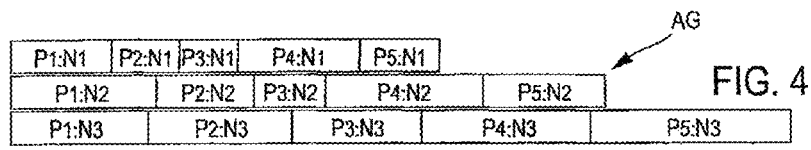
FIG. 4 shows the organisation of the animation data in FIG. 2, according to a second method for implementing the invention, where the level of the same rank in all the images are stored, one after the other, from the first to the last levels.

In a second implementation method for the invention, the levels' data are re-organised as shown in FIG. 4, in a specific animated AG medium, so that all the initial levels N1 are copied at the start of the AG medium, in the order of the Pn images, followed by the second levels N2, then the third levels N3, in the same order. In this arrangement, all the first levels Pn:N1 are read before the second Pn:N2, then the third Pn:N3.

In this configuration, the first image can be displayed once the corresponding first level P1:N1 has been read and decompressed, and so on, so that whoever views such an animation, does not need to fully decompress the corresponding image. Every time it is planned to play a Pn image, it may be played by using, if so wished, all the data available for this image.

Figure 5:
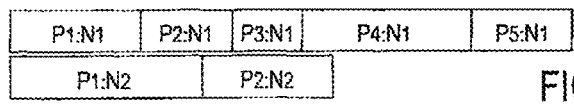
FIGS. 5 and 6 show, respectively, according to a representation in one and two dimensions, a possible method for displaying the animation, according to the invention's process in the FIG. 4 implementation method.
Figure 6:
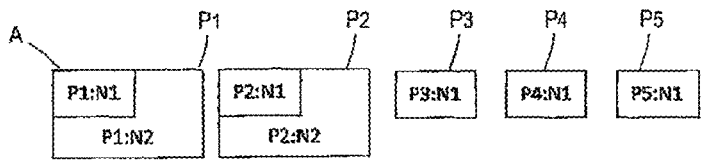

Consequently, the animation may be played by several methods: for each image to be placed, all the levels available for this image may be decompressed. This reading method is represented in FIGS. 5 and 6. At the stage shown in FIG. 5, all the initial levels Pn:N1 were read and decompressed, as well as only the second levels of the two initial images P1:N2 P2:N2. Then the A-animation can be played as in FIG. 6, as both the initial images P1 and P2 are played in their intermediate resolution, corresponding to the details of the second level N2, the following images P3-P5, are played at their lowest resolution, corresponding to the details of their respective initial level N1.

The image can also be decompressed by using the highest resolution available for all the images. For example, if level N1 of all the P images is available, but only some of the N2 levels, only level N1 can be decompressed and displayed for each image, so as not to bring about a change in the resolution between two successive images. In this way, in the case shown in FIG. 5, all the images will be played according to the resolution of the level N1.

An image may also be decompressed until the "useful" resolution is obtained, in other words, the resolution at least the same as the one in which the animation is played.

The images in the medium can be compressed and decompressed by various compression methods, from the moment when the compression allows spatial scalability, and where the information can be combined from successive levels to obtain an image with higher resolution.

As an embodiment of the invention, at least one Pn image can be compressed according to the wavelet method. The compression methods based on the wavelets are particularly effective for compressing "natural" images such as photographs. Furthermore, images compressed by means of a method based on wavelets in general has several levels that be organised with a medium, depending on the invention.

In a second way embodiment of the invention, at least one image in the medium is encoded according to a method based on the differences between the values of the adjacent pixels. The compression methods based on the differences between adjacent pixels in general are particularly effective for compressing the strongly contrasted synthetic images. An image compressed using a method based on the differences between the values of the adjacent pixels may include several successive levels, if the levels represent sub-sets with the size of the image's pixels increasing, and if the pixels of a level are at least partially encoded on the basis of the differences in relation to the pixels of the preceding levels. There are then several successive levels which can be organised according to one of the production methods described by FIGS. 3 and 4.

In a third embodiment, at least two images are compressed according to two different compression methods. For instance, at least one initial image can be compressed by a compression method containing one transformed by wavelets and at least a second image can be compressed according to a compression method containing a difference between two adjacent pixels.

This embodiment makes it possible to obtain the most effective compression possible depending on the type of image. Images with low contrast may be encoded using the method including one transformed by wavelets, and the contrasted images may be encoded using the method including the differences between two adjacent pixels. As an embodiment of the invention, a method for creating a multipage animation comprises a stage detecting the type of image in order to apply the most suitable compression method.

To be able to decode each image using the suitable method, the medium according to the invention may contain heading information indicating, for each image, the compression method which had been used;

Time information may be combined with the AM, AG medium, indicating the number of images to be played each second, the animation may be played according to the time information given. Means and stages may be planned to modify the medium's display rate when writing and/or reading the medium, to be able to use slow motion or speeded up effects, or again by restoring all or part of each image when the user or an application requires it.

On the basis of data of the animated medium AM, AG, data corresponding to a Pn image can also be extracted from among the animation's images. In this way, the Pn to image can be restored as a still image depending on what is needed, by extracting, or by reading, and re-organising the image's levels Pn:N1, Pn:N2, etc., keeping the compressed data as they are.

Rather than being played on a timing basis, in the form of the animation, the animated medium AG may be used as a folder for the P1-P5 images. The lower N1 or intermediate N2 levels may be used for display in the form of icons, and a user who selected a Pn image from among the P1-P5 images, only the Pn image will be fully read and decompressed to be displayed as a still with its highest resolution, on the basis of information corresponding to the third level Pn:N3.

When running the invention, such a medium is used to shoot several still images continuously. This capture may be made using a still or film camera, or from successive screenshots. After having been captured, it is compressed and stored at several levels. When the capture is finished, the user selects; from among the images stored, the one he wishes to convert into an animated image. This selection may concern all the images, one image out of two, the second half of the images, etc. The user combines a reading speed with this medium, which can correspond not only to the capture speed, but also to a greater or lesser speed to create slow motion or speeded up effects. The application then creates, from the compressed images, an image medium organised by levels, such as the animated medium AG in FIG. 4.

An image extracted from the medium may also be stored separately, in the form of a medium containing a single still image.

Of course, the invention is not limited to the examples that have just been described.

In this way, the number of levels is not limited to 3, there may be 2 or 4 or more than 4; thus, thanks to the process according to the invention, images of a gradually greater size than those generally used in GIFs can be rapidly displayed, particularly by increasing the number of levels.

Therefore, the invention proposes processes for compressing and decompressing animated images using scalability. These processes enable the animation receptor to display it from data already arrived, without necessarily having received everything.

The invention claimed is:

1. A process for producing an animation, wherein said animation is of a multipage type, said process comprising:
   obtaining an animation medium comprising a plurality of still images with scalability properties, wherein said animation medium is a file;
   wherein the plurality of still images comprises a playing order,
   each of said still images is stored in at least one level, each level having a rank corresponding to a resolution, wherein a higher rank corresponds to a higher resolution; and
   wherein there are at least three ranks;
   arranging in the animation medium, in a reading order of said animation medium:
   all levels of a first rank in the playing order, the first rank being a lowest rank;
   then all levels of a second rank in the playing order, the second rank being an immediately higher rank than said first rank; and then
   repeatedly arranging in the animation medium, in the reading order of the animation medium, each consecutive rank, by arranging all levels of each consecutive rank in the playing order, until all of the levels of each of the still images have been arranged.

2. The process according to claim 1, wherein each of the still images is stored in at least two levels, and wherein a first level comprises the least details and each following level provides more details than a preceding level.

3. The process according to claim 2, further comprising:
playing an image by playing a level of a lower rank before playing a level of a higher rank.

4. The process according to claim 3, further comprising:
decompressing and displaying data contained in all the levels of each image.

5. The process according to claim 3, further comprising:
decompressing and displaying data corresponding only to levels available for all the images.

6. The process according to claim 3, further comprising:
decompressing and displaying data corresponding to a smallest set of levels, thereby enabling achievement of at least a given image display resolution.

7. The process according to claim 1, further comprising:
playing an image according to data stemming from a level of said image before reading and processing data in a level with a higher rank.

8. The process according to claim 1, further comprising:
processing and resizing an image to achieve a display resolution sought, before playing the image.

9. The process according to claim 1, wherein the still images were previously compressed by a method including at least one transformed by wavelets.

10. The process according to claim 1, wherein the still images were previously compressed by a method including at least one difference between two adjacent pixels.

11. The process according to claim 1, wherein at least one of the still images was compressed using a first compression method, and at least a second of the still images was compressed using a second compression method.

12. The process according to claim 11, further comprising an analysis stage of analysing each still image to determine a most suitable compression method.

13. The process according to claim 12, wherein the first compression method comprises at least one transformed by wavelets, and the second compression method comprises at least one difference between two adjacent pixels.

14. The process according to claim 13, wherein the analysis stage comprises filing the images by contrast level, wherein least contrasted images are compressed according to the first method, and most contrasted images are compressed according to the second method.

15. The process according to claim 1, wherein an image medium is a file.

16. The process according to claim 15, further comprising:
selecting a still image in the animation medium, wherein a level of a rank is used to display a preview of the images without reading or processing levels of a higher rank.

17. The process according to claim 16, further comprising:
creating the still image medium from levels of the still image selected.

18. A non-transitory computer readable medium on which is stored a program, which when executed by a computer, causes the computer to implement the process according to claim 1.

19. A non-transitory computer readable medium on which is stored a program, which when executed by a computer, causes the computer to produce a multipage type of animation, wherein:
the computer produces the animation using an animation medium comprising a plurality of still images with scalability properties, wherein the animation medium is a file;
the plurality of still images comprises a playing order;
each of said still images is stored in at least one level, each level having a rank corresponding to a resolution, wherein a higher rank corresponds to a higher resolution; and
the levels of the images are arranged in the animation medium, in a reading order of said animation medium, with all levels of a first rank in the playing order, the first rank being a lowest rank, followed by at least a second rank and a third rank, and all levels of immediately higher ranks than a rank of a preceding arrangement of levels, in the playing order, in the animation medium.

* * * * *